(12) United States Patent
Krull et al.

(10) Patent No.: US 6,301,637 B1
(45) Date of Patent: Oct. 9, 2001

(54) HIGH PERFORMANCE DATA PATHS

(75) Inventors: Nicholas J. Krull, Louisville; William A. Burns, Boulder; Stephen S. Selkirk, Broomfield, all of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/093,143

(22) Filed: Jun. 8, 1998

(51) Int. Cl.[7] ............................ G06F 12/00; G06F 13/00
(52) U.S. Cl. ..................... 711/112; 711/111; 710/100; 710/106; 710/131
(58) Field of Search .................... 711/111, 112, 113, 711/114; 710/106, 100, 131; 370/462, 360, 366, 538, 58.2; 709/225, 229

(56) References Cited

U.S. PATENT DOCUMENTS

| | | | |
|---|---|---|---|
| 4,630,258 | * | 12/1986 | McMillen et al. ............... 370/60 |
| 4,918,688 | * | 4/1990 | Krause et al. .................. 370/76 |
| 4,972,161 | * | 11/1990 | Davies et al. .................. 331/1 |
| 5,041,963 | * | 8/1991 | Ebersole et al. ............... 364/200 |
| 5,193,149 | * | 3/1993 | Awiszio et al. ................ 395/200 |
| 5,299,201 | * | 3/1994 | Carusone, Jr. et al. .......... 371/51 |
| 5,333,198 | * | 7/1994 | Houlberg et al. ............... 380/49 |
| 5,517,662 | * | 5/1996 | Coleman et al. ................ 395/800 |
| 5,546,385 | * | 8/1996 | Caspi et al. ................... 370/58.2 |
| 5,604,735 | * | 2/1997 | Levinson et al. ............... 370/360 |
| 5,726,991 | * | 3/1998 | Chen et al. .................... 371/5.1 |
| 5,790,058 | * | 8/1998 | Burzio et al. .................. 341/101 |
| 5,812,792 | * | 9/1998 | Haddock et al. ............... 395/200.79 |
| 5,953,508 | * | 9/1999 | Iwatsuki et al. ................ 395/224 |
| 5,974,058 | * | 10/1999 | Burns et al. ................... 370/538 |
| 5,991,296 | * | 11/1999 | Mu et al. ...................... 370/380 |
| 6,021,495 | * | 2/2000 | Jain et al. ..................... 713/201 |
| 6,073,186 | * | 6/2000 | Murray et al. .................. 710/11 |
| 6,081,557 | * | 6/2000 | Suemura et al. ................ 375/259 |
| 6,085,257 | * | 7/2000 | Ducaroir et al. ................ 710/1 |

OTHER PUBLICATIONS

"SiI140/SiI141 Datasheet", Silicon Image, Inc. Version 1.0 Dec. 1997, Pub. # DS140/141/001–127–100.

* cited by examiner

*Primary Examiner*—Kevin L. Ellis
*Assistant Examiner*—Kimberly McLean
(74) *Attorney, Agent, or Firm*—Brooks & Kushman P.C.

(57) ABSTRACT

A system for busing data in a DASD controller is described. The system includes adapters serving computer elements such as processors and disk arrays. Cache memory in the controller is divided amongst memory cards. At least one switch is connected to each memory card. Bidirectional multichannel serial links connect each adapter with a switch. Each switch can establish at least one path between each adapter connected to the switch and each memory card.

14 Claims, 4 Drawing Sheets

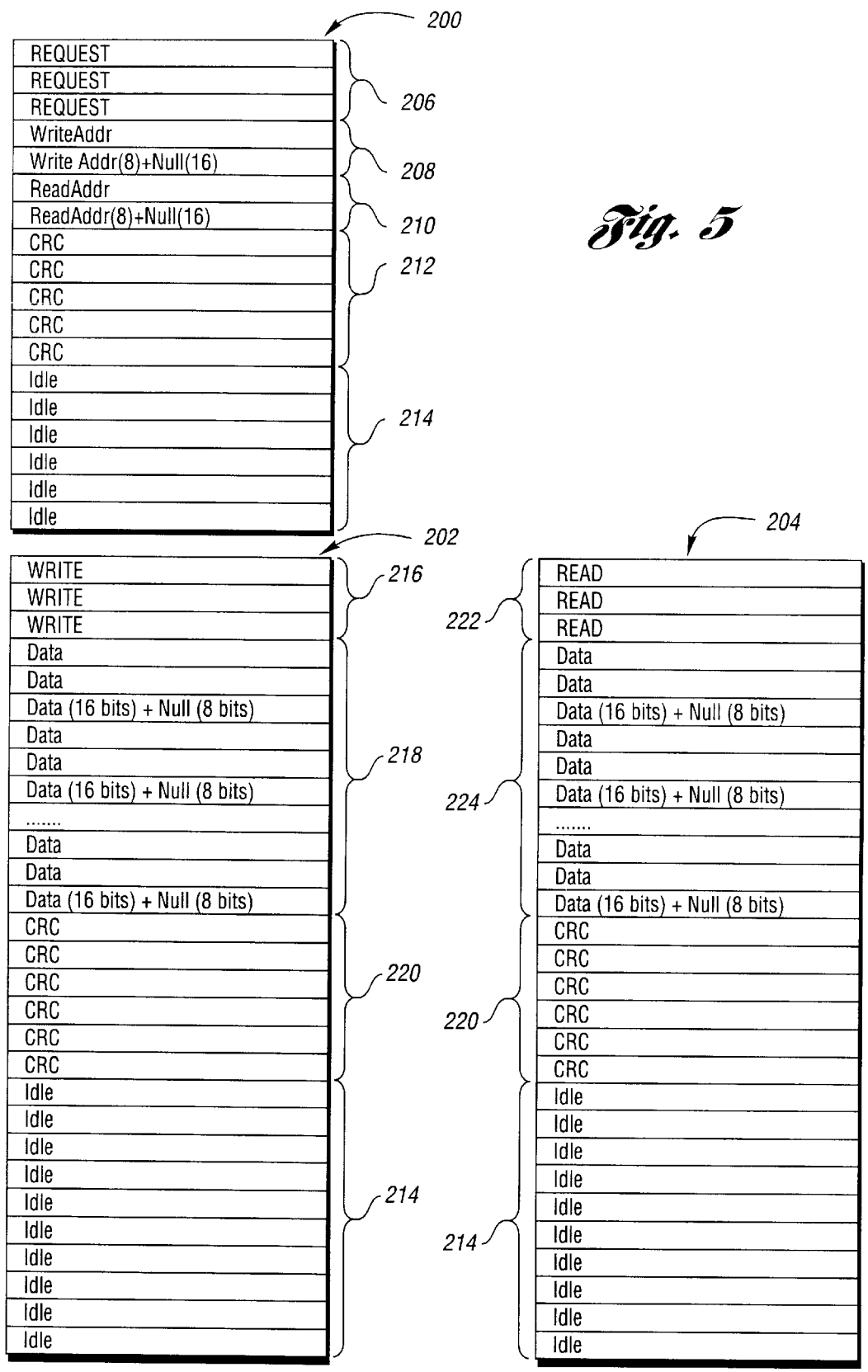

HIGH PERFORMANCE DATA PATHS

TECHNICAL FIELD

The present invention relates to high performance data paths for busing data in devices such as direct access storage device controllers.

BACKGROUND ART

A direct access storage device (DASD) is an on-line digital storage device, such as a magnetic disk drive, that allows rapid read and write operations. Often, DASD systems include more than one disk for increased reliability and crash recovery. Such a system can be a redundant array of inexpensive disks (RAID) unit.

In order to meet greater performance demands, DASD controllers must be capable of handling data at increasing rates. Designing multiple very high data rate channels within a DASD controller unit and, specifically, to and from a central cache memory is limited with current parallel bus structures. Such a parallel bus system in shown in FIG. 1.

One possible solution for increasing the data rate is to make the parallel bus wider by increasing the number of data wires. This results in several difficulties such as a greater number of traces on a printed circuit board (PCB) requiring valuable board real estate, additional driver/receiver pairs, additional connector pins to provide circuit card-to-circuit card interconnection and increased associated electrical power.

Another possible solution for increasing the data rate is to send parallel bus control signals on dedicated wires. These separate signals, called sideband signals, may signal the start of transmission, provide timing, specify intended receivers, request attention, or indicate success or failure. Using sideband signals increases the number of connecting wires and, hence, suffers from the same drawbacks as increasing the number of data wires.

Still another possible solution for increasing the data rate is to increase the clock rate used on an existing parallel bus. However, decreasing the time between clock edges is limited by the physics of parallel connecting devices. In particular, each device has an associated capacitance. The total capacitance is the sum of the individual capacitances and the distributed capacitance of the interconnecting trace. The velocity of propagation of a signal down the bus is inversely proportional to this total capacitance and, therefore, the clock switching speed is directly limited by the total capacitance.

A further possible solution for increasing the data rate is to use a currently available serial protocol for busing data within the DASD controller. Such protocols include SONET (Synchronous Optical NETwork), Fiber Channel, and USB (Universal Serial Bus). However, these protocols were designed primarily for connection between devices and not intradevice busses; and primarily for use with particular interconnection media such as fiber optic cable, coaxial cable, or twisted pairs. Therefore, use in PCB busses results in data transfer rates no greater than 200 megabytes per second, which is below the capabilities achievable using interconnection media for which the existing protocols were designed. Additionally, the latency inherent in these protocols is troublesome and difficult to reduce.

In addition to simply increasing the data rate on a DASD buss, data must be written to two different disks in a RAID 1 system. One solution with current parallel buses is to send the data twice, effectively halving the data transfer rate. Another solution is to provide multiple parallel paths, requiring twice the hardware. Still another solution is to construct a special protocol enabling two recipients to receive the same data, requiring more complex logic in the protocol engine and potential performance degradation.

What is needed is a bus system that can achieve increased data rates without incurring the problems associated with increasing the number of wires, using sideband signals, increasing the clock rate, or using current serial bus protocols. The ability to support RAID 1 should also be provided.

SUMMARY OF THE INVENTION

It is a primary object of the present invention to increase the data transfer rate over existing parallel bus systems.

Another object of the present invention is to require less PCB real estate, fewer driver/receiver pairs, and less interconnections than existing parallel bus systems.

Still another object of the present invention is to develop a bus system with lower cost than existing parallel bus systems.

A further object of the present invention is to support RAID 1.

In carrying out the above objects and other objects and features of the present invention, a system is provided for busing data in a direct access storage device (DASD) controller serving a plurality of computer elements. The system includes adapters communicating with one of the computer elements, a plurality of memory cards, at least one switch, each switch in communication with each memory card, and a plurality of bidirectional multichannel serial links, each link connecting one adapter to one switch. Each switch can establish at least one path between each adapter connected to the switch and each memory card.

In one embodiment, each switch includes a set of path controls, each path control controlling one direction of the bidirectional multichannel serial link. In a further refinement, the system includes a second plurality of bidirectional multichannel serial links. Each path control is connected to each memory card by at least one of the second plurality of bidirectional multichannel serial links. In yet another refinement, the switch further includes a switch bus interconnecting a set of path controls and a switch arbiter to determine access to the switch bus.

In another embodiment, each adapter can generate a request frame specifying one or both of a read address and a write address, transmit a write frame if the write address is specified, and receive a read frame if the read address is specified. Transmitting a write frame and receiving a read frame happen concurrently if both the read address and the write address are specified in the request frame.

In still another embodiment, each bidirectional multichannel serial link includes a plurality of serial data drivers in the adapter and corresponding serial data receivers in the switch, a set of unidirectional pairs carrying serial data from each serial data driver in the adapter to the corresponding serial data receiver in the switch, a plurality of serial data drivers in the switch and corresponding serial data receivers in the adapter, and another set of unidirectional pairs carrying serial data from each serial data driver in the switch to the corresponding serial data receiver in the adapter.

In a further embodiment, each direction of each bidirectional multichannel serial link includes a plurality of serial data drivers, a serial data receiver in communication with each corresponding serial data driver, a serial clock driver, and a serial clock receiver in communication with the serial clock driver. In a refinement, each direction of each serial link further comprises a group serial transmitter that can input a parallel data value at a slow clock rate, convert the parallel data value into a plurality of serial sequences, generate a fast clock rate from the slow clock rate, transmit each serial sequence using one of the plurality of serial data drivers at a rate determined by the fast clock rate, and transmit a signal corresponding to the fast clock rate using the serial clock driver. A group serial receiver can accept the signal corresponding to the fast clock rate from the serial clock driver, accept the plurality of serial sequences from the plurality of serial data drivers, generate a slow clock rate from the fast clock rate, convert the plurality of serial sequences to a parallel representation of the data value, output the parallel representation of the data value at the slow clock rate, and output a signal corresponding to the slow clock rate. The serial drivers and receivers may be implemented with flat panel display drivers and receivers.

In the preferred embodiment, all of the above embodiments are employed.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 5 is a schematic diagram of an exemplary protocol for simultaneous read and write operations according to the present invention.

BEST MODES FOR CARRYING OUT THE INVENTION

Figure 1:
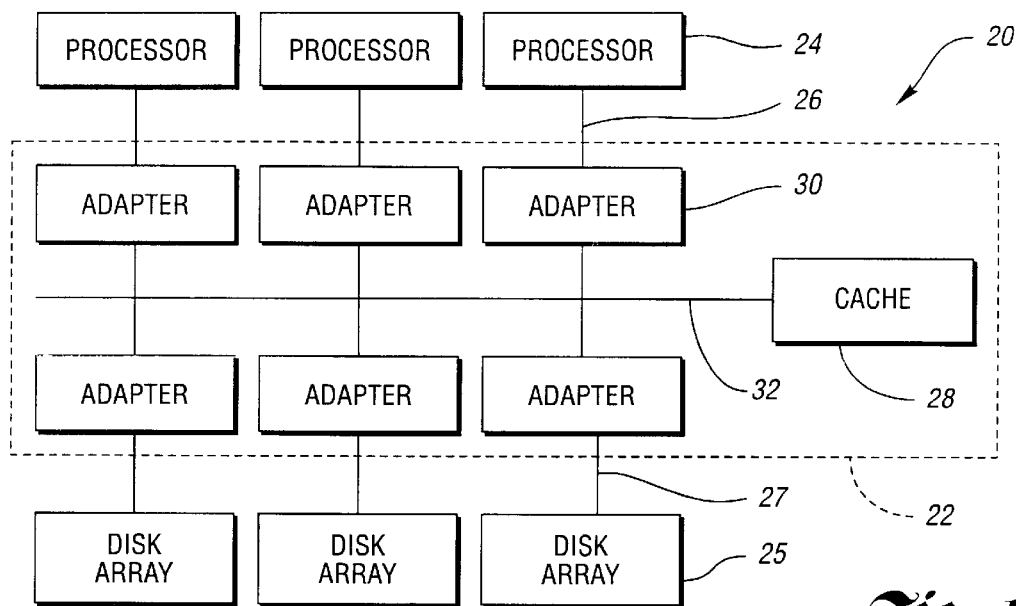
FIG. 1 is a block diagram of a computer system having a DASD controller with a traditional parallel bus architecture.

Referring now to FIG. 1, a block diagram of a computer system having a DASD controller with a traditional parallel bus architecture is shown. Parallel bus computer system 20 includes parallel bus DASD controller 22 and computer elements such as processors 24 and disk arrays 25. Processor 24 may be connected to parallel bus DASD controller 22 through processor bus 26 such as SCSI (Small Computer System Interface), ESCON (Enterprise System Connection), HIPPI (High Performance Parallel Interface), Fiber Channel, or FIPS (Federal Information Processing Standard). Disk array 25 may be connected to parallel bus DASD controller 22 through disk array bus 27 such as SCSI or Fiber Channel. Although three processors, three disk arrays, and six adapters are shown, any number of processors and disk arrays together with their associated adapters are possible in computer system 20.

Parallel bus DASD controller 22 contains parallel cache 28. A cache is a large memory system accessible by processor 24 or disk array 25. Parallel adapter 30 is operative to interface with processor 24 or disk array 25 through processor bus 26 or disk array bus 27 respectively and thereby access cache 28 using parallel bus 32.

Figure 2:
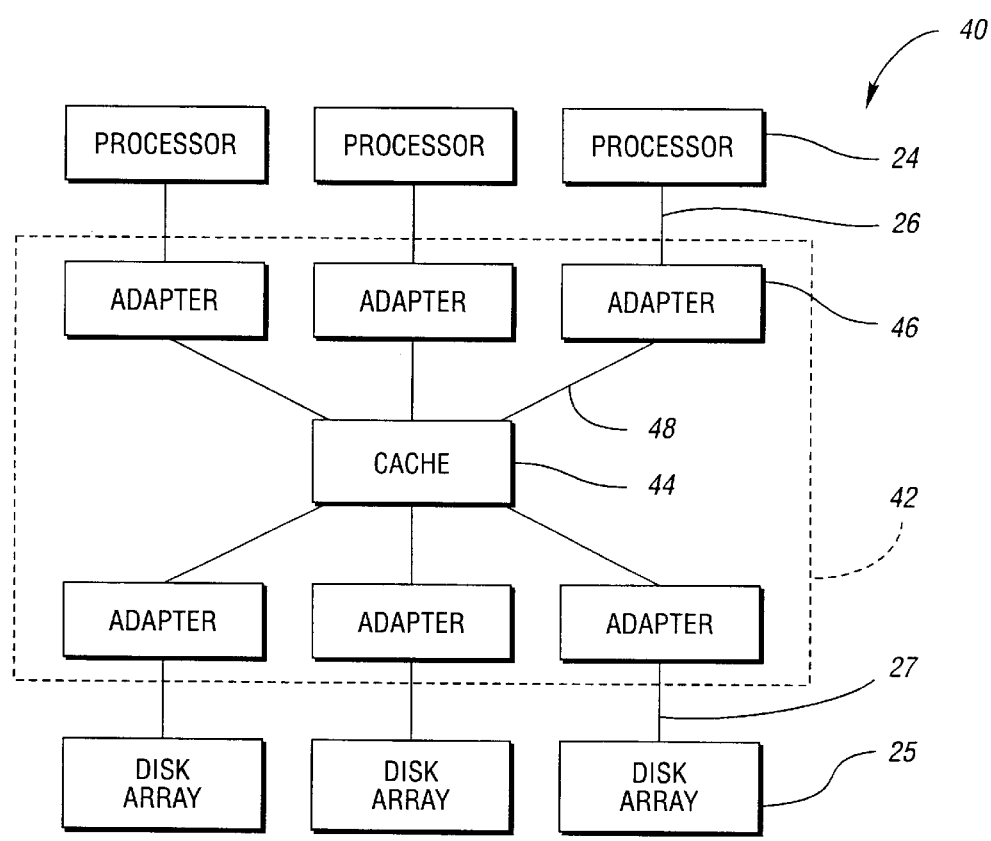
FIG. 2 is a block diagram of a computer system having a DASD controller according to the present invention.

Referring now to FIG. 2, a block diagram of a computer system having a serial link DASD controller is shown. Serial link computer system 40 includes the same processors 24, disk arrays 25, processor buses 26 and disk array buses 27 as in parallel computer system 20. However, serial link DASD controller 42 is substituted for parallel DASD controller 22. Although three processors, three disk arrays, and six adapters are shown, any number of processors and disk arrays together with their associated adapters are possible in computer system 40.

DASD controller 42 contains serial cache 44. Serial adapter 46 provides the interface between processor 24 or disk array 25 and cache 44, connected through processor bus 26 or disk array bus 27 respectively and adapter 46. A performance increase will occur by replacing parallel bus 32 with bidirectional multichannel serial link 48 between each adapter 46 and cache 44.

Figure 3:
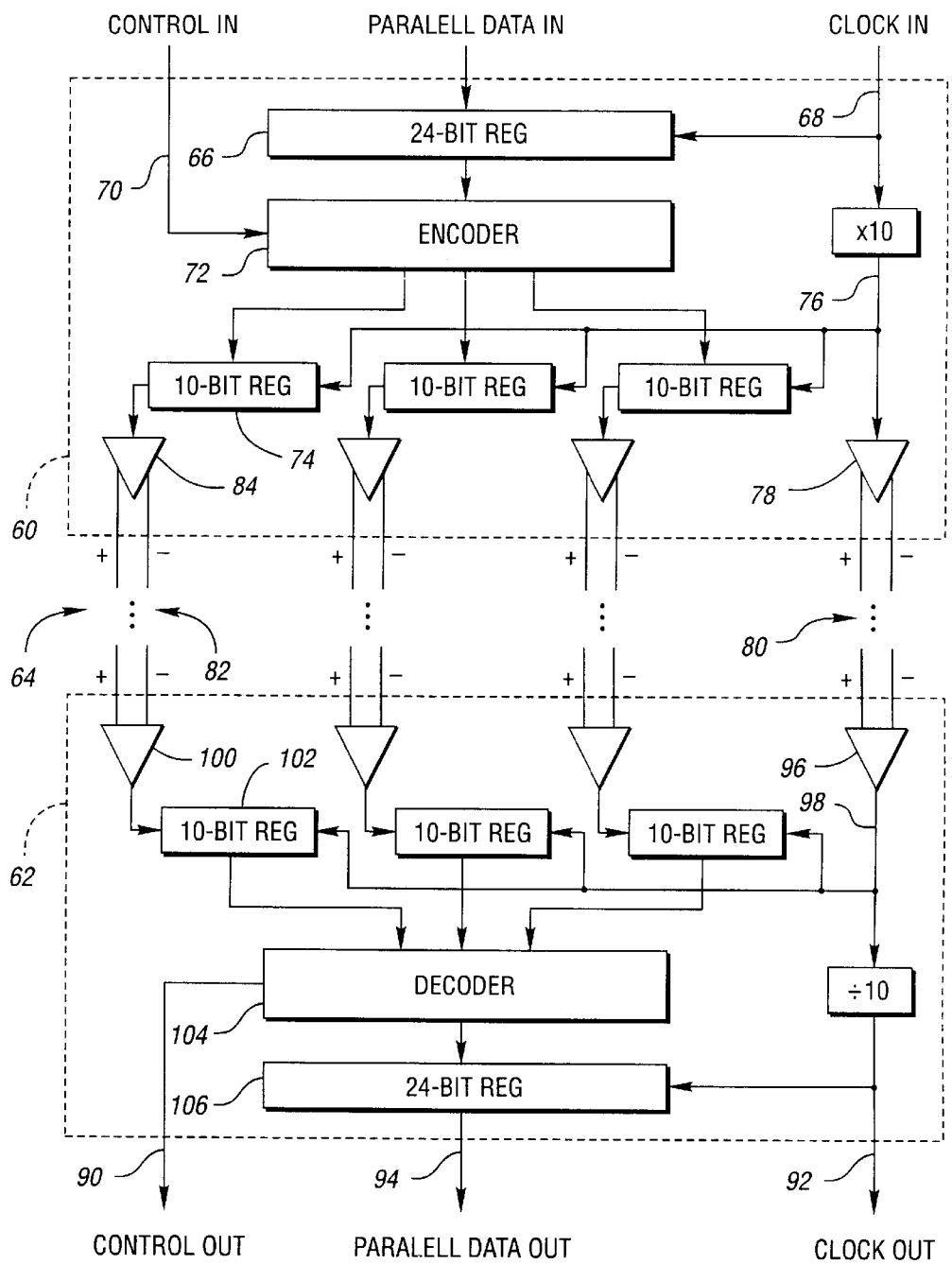
FIG. 3 is a schematic diagram of a set of driver and receiver pairs implementing a multichannel serial link according to the present invention.

Referring now to FIG. 3, a schematic diagram of a set of driver and receiver pairs implementing a multichannel serial link according to the present invention is shown. Each bidirectional multichannel serial link 48 includes two unidirectional multichannel serial links, each unidirectional link providing communication in one direction. Group serial transmitter 60 (TX) sends and group serial receiver 62 (RX) receives signals over a set of three or more serial channels, shown generally by 64. Set of serial channels 64 connecting group serial transmitter 60 and group serial receiver 62 defines a point-to-point unidirectional multichannel serial path.

Group serial transmitter 60 accepts parallel data in input register 66 clocked by input parallel clock 68. Group serial transmitter 60 also accepts control input on control in bus 70. Control input may include, but is not limited to, indications for error, read frame, write frame, diagnostic frame, start of frame, and end of frame.

Encoder 72 receives control input from control in bus 70 and data from input register 66. Encoder 72 develops a parallel code corresponding to either the control input on control in bus 70 or the data value in input register 66 depending on the control input on control in bus 70. Parallel-to-serial register 74 accepts a portion of the parallel code from encoder 72 and shifts out a serial sequence bit stream clocked by serial clock 76. Serial clock 76 is produced by multiplying the frequency of input parallel clock 68 by a value equal to the number of bits in parallel-to-serial register 74. Serial clock driver 78 outputs a signal corresponding to serial clock 76 onto serial clock channel 80. Each of the remaining channels in set of serial channels 64 is a serial data channel, one of which is shown as 82, and is driven by a corresponding serial data driver 84. Serial data channel 82 transmits a signal corresponding to the serial sequence bit stream produced by parallel-to-serial register 74.

In a preferred embodiment, serial data drivers 78 and serial clock driver 84 are implemented with a serial flat panel display driver having a differential output such as the SII140 manufactured by Silicon Image, Inc. The non-standard use of serial flat panel display drivers allows construction of a high reliability communication link. This link has an inherently low cost due to the volume leverage of the flat panel display industry. Furthermore, continued developments in flat panel technology will produce increasing serial transfer rates and increasing functionality at decreasing piece prices.

In order to exploit the differential output of serial driver 78,84, encoder 72 is operative to produce a DC balanced signal. In particular, encoder 72 accepts a 24-bit input word and develops a 30-bit code. The 30-bit code is divided into three 10-bit codes, each of which is DC balanced within one bit. The one-bit out-of-balance is compensated for by inserting idle clockings between frames. Each 10-bit code is clocked into a corresponding parallel-to-serial register 74.

Referring again to FIG. 3, group serial receiver 62 accepts serial channels 64 and outputs control on control out bus 90 corresponding to the control signal input on control in bus 70, output parallel clock 92 corresponding to input parallel clock 68, and output parallel data 94 clocked by output parallel clock 92 corresponding to the data received by input register 66.

Serial clock receiver 96 accepts serial clock channel 80 and outputs serial clock 98. Each serial channel 82 carrying a serial sequence bit stream is received by a serial data receiver 100. Serial data receiver 100 outputs a signal to serial-to-parallel register 102 clocked by serial clock 98. Each serial-to-parallel register 102 delivers a parallel word to decoder 104. Decoder 104 produces a control signal on control out bus 90 or a parallel data word depending on the value received by decoder 104. Serial clock 98 is divided by a factor equal to the number of bits in serial-to-parallel register 102 to produce output parallel clock 92. Data output from decoder 104 is clocked into output register 106 by output parallel clock 92. The output of output register 106 is output parallel data 94.

In a preferred embodiment, serial data receivers 100 and serial clock receiver 96 are implemented with a serial flat panel display receiver having a differential input and matching serial data drivers 78 and serial clock driver 84, such as the SII141 manufactured by Silicon Image, Inc. Decoder 104 converts the balance coded input from serial-to-parallel registers 102 into an uncoded value. To match the encoding scheme used in group serial transmitter 60, three 10-bit registers 102 are used for serial-to-parallel conversion and the resulting 30-bit encoded value is decoded by decoder 104.

Figure 4:
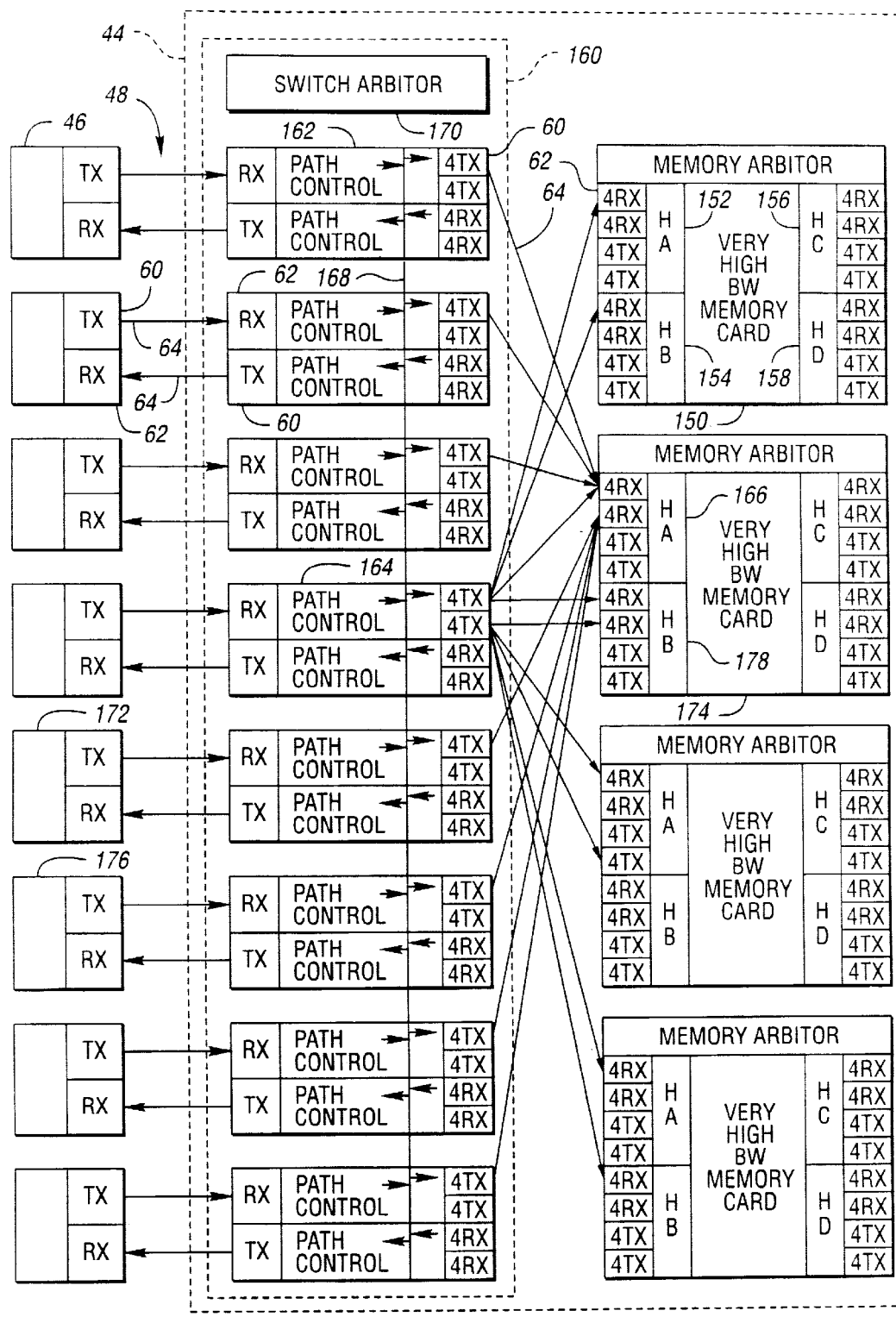
FIG. 4 is a schematic diagram of a portion of an exemplary DASD controller according to the present invention.

Referring now to FIG. 4, a schematic diagram of a portion of an exemplary DASD controller according to the present invention is shown. Approximately half of DASD controller 42 is shown in FIG. 4. In the embodiment described, cache 44 includes four high bandwidth (BW) memory cards, one of which is indicated by 150. The memory in each memory card is divided into banks, not shown for clarity. Each bank may be accessed through one or more hubs. In the exemplary embodiment shown, each memory card has four hubs, referred to as hub A (HA), hub B (HB), hub C (HC), and hub D (HD). Each hub can be accessed by eight bidirectional serial links. Connections for each hub include eight group serial transmitters 60 and eight group serial receivers 62. The eight transmitters and eight receivers are shown as two groups of four for clarity.

In the exemplary embodiment, each of sixteen adapters 46 may connect to cache 44. FIG. 4 shows only eight of the sixteen for clarity. Half of the sixteen adapters are connected with half of the hubs on each memory card through switch 160. The remaining eight adapters connect with the remaining hubs through a second switch 60 not shown. Each adapter 46 is connected to switch 160 through bidirectional multichannel serial link 48. Group serial transmitter 60 in adapter 46 sends information along serial channels 64 to a corresponding group serial receiver 62 in switch 160. Likewise, group serial receiver 62 in adapter 46 receives information along serial channels 64 from a corresponding group serial transmitter 60 in switch 160.

Each set of serial channels 64 between switch 160 and adapter 46 has a corresponding path control 162. Each path control 162 determines to which bank in cache 44 the corresponding set of serial channels 64 will be connected based in part on desired memory location and memory availability. In the exemplary embodiment, each path control 162 is connected to eight hubs. One of these connections may be active at any time. A subset of all connections are shown in FIG. 4. All hub connections for the path control indicated by 164 are shown. All connections entering hub A indicated by 166 are also shown.

Switch 160 may also include switch bus 168 and switch arbiter 170 to alleviate switch conflicts. For example, suppose the adapter indicated by 172 requests and is granted access to the memory card indicated by 174. Switch 160 sets up a path through hub A 166. Suppose further that the adapter indicated by 176 also requests access to memory card 174. Provided that path control 164 is not already in use, switch arbiter 170 could route a path along switch bus 168 to path control 164 connected to the hub B indicated by 178 and thereby to memory card 174.

Another possible use for switch bus 168 is for implementing RAID 1. For example, two of adapters 46 service disk arrays 25. A disk in each array is to receive identical information held in cache 44. Path control 162 for a first receiving adapter 46 establishes a connection with memory card 150 containing the information. Path control 162 also establishes a connection with a second receiving adapter 46 through switch bus 168. As data is read into path control 162, the data is duplicated, one copy forwarded to first receiving adapter 46 and one copy forwarded to second receiving adapter 46 using switch bus 168.

Still another possible use for switch bus 168 is to directly connect two or more of adapter 46 without using any of memory in memory card 150. Such an operation may be used by processor 24 directly accessing disk array 25.

Since data handled by path control 162 is parallel, switch bus 168 could require a substantial number of lines. Therefore, switch bus 168 may be implemented with an intermediate level of serialization. For example, if the data in path control 162 is 72 bits wide, switch bus 168 may be implemented with eight lines, each line clocked at a rate nine times faster than the rate data is clocked in path control 162.

The half of cache 44 not shown in FIG. 4 is approximately a mirror image of the half that is shown. A second switch 160 is used to interface eight additional adapters 46 to memory cards 150.

The above described system is provided to illustrate a DASD controller according to the present invention. Many variations on the system are possible within the scope and spirit of the present invention. The numbers of adapters, memory cards, and switches may be varied. Also, the interconnection of switches and memory cards may be modified.

Referring now to FIG. 5, a schematic diagram of an exemplary protocol for simultaneous read and write operations according to the present invention is shown. Under normal operation, a request frame, shown generally by 200, from adapter 46 is followed by one or two data frames consisting of either a write frame, shown generally by 202, a read frame, shown generally by 204, or simultaneous read frame 202 and write frame 204 over bidirectional link 48. The sequence of request frame 200 followed by a data frame slot for read, write, or both concurrently repeats continuously unless an error is detected. Once the error is resolved, the sequence continues with a request frame.

Each frame consists of a sequence of 24-bit words, each word clocked at the rate of parallel clock 68,92. Each frame is separated from an adjacent frame by at least a ten clock blanking period, or ten idles. Each frame is identified by a five-bit control character which is repeated for three clockings. The control character is received by control in bus 70, transmitted over serial link 64, and decoded onto control out bus 90.

Referring again to FIG. 5, an example request frame 200 is shown. The first three clocks define request frame header 206 wherein the request frame control character is repeated for each clocking. If a write is desired, write information 208 is supplied in two clockings. Write information 208 includes a 32-bit write starting cache address, the most significant three bytes in the first clocking and the remaining byte in the second clocking. The remaining sixteen bits of the second clocked word are padded with nulls. If no write is requested, write information 208 is filled with nulls. Read information 210 includes a read starting cache address and read frame count similar to write information 208. If no read is requested, read information 210 is filled with nulls. Request block cyclic redundancy code (CRC) 212 is added for error detection and correction. Idle clockings 214 separate request frame 200 from the next frame.

An example write frame 202 is shown. The first three clocks define write frame header 216 wherein the write frame control character is repeated for each clocking. Write data 218 is sent in sets of 64 bits each three clockings. The remaining eight bits are padded with nulls. In a preferred embodiment, write data 218 can contain up to two kilobytes of data. If less than two kilobytes of data are sent, the remaining clockings can be filled to ensure that write frame 202 has a consistent length. Data block cyclic redundancy code (CRC) 220 is added for error detection and correction. In a preferred embodiment, CRC bits cover the data nulls. Idle clockings 214 separate write frame 202 from the next frame.

An example read frame 204 is also shown. The first three clocks define read frame header 222 wherein the read frame control character is repeated for each clocking. Read data 224 is sent in sets of 64 bits each three clockings. The remaining eight bits are padded with nulls. In a preferred embodiment, read data 224 can contain up to two kilobytes of data. If less than two kilobytes of data are sent, the remaining clockings can be filled to ensure that read frame 204 has a consistent length. Data block cyclic redundancy code (CRC) 220 is added for error detection and correction. In a preferred embodiment, CRC bits cover data nulls. Idle clockings 214 separate write frame 202 from the next frame.

The above described protocol is provided to illustrate simultaneous read and write operations. Many variations on the protocol are possible within the scope and spirit of the present invention. For example, a different amount of data may be transferred. Also, the type and amount of error correction may be varied. Further, the header format can me modified. Reserved words may also be inserted for future expansion of functionality.

While the best modes for carrying out the invention has been described in detail, other embodiments are possible. For example, the present invention may be used to interface other input and output devices to a computer system. Also, the present invention can be readily adapted for use in serial communication systems. Those familiar with the art to which this invention relates will recognize various alternative designs and embodiments for practicing the invention as defined by the following claims.

What is claimed is:

1. A system for busing data in a direct access storage device (DASD) controller, the DASD controller serving a plurality of computer elements, the system comprising:

a plurality of adapters, each adapter in communication with one of the computer elements;

a plurality of memory cards;

at least one switch, each switch in communication with each memory card; and a plurality of bidirectional multichannel serial links, each link connecting one adapter to one switch;

wherein each switch is operable to establish at least one path between each adapter connected to the switch and each memory card.

2. The system for busing data in a DASD controller as in claim 1 wherein each of the at least one switch comprises a plurality of path controls, each path control controlling one direction of the bidirectional multichannel serial link.

3. The system for busing data in a DASD controller as in claim 2 further comprising a second plurality of bidirectional multichannel serial links, each path control connected to each memory card by at least one of the second plurality of bidirectional multichannel serial links.

4. The system for busing data in a DASD controller as in claim 3 wherein each path control is connected to two hubs on each memory card.

5. The system for busing data in a DASD controller as in claim 2, the switch further comprising:

a switch bus interconnecting a plurality of path controls; and a switch arbiter in communication with each path control interconnected by the switch bus, the switch arbiter operative to determine access to the switch bus.

6. The system for busing data in a DASD controller as in claim 1 wherein each adapter is operative to:

generate a request frame specifying at least one of a set comprising a read address and a write address;

transmit a write frame comprising data written to the write address if the write address is specified in the request frame; and receive a read frame comprising data read from the read address if the read address is specified in the request frame;

wherein transmitting a write frame and receiving a read frame happen concurrently if both the read address and the write address are specified in the request frame.

7. The system for busing data in a DASD controller as in claim 1 wherein each bidirectional multichannel serial link comprises:

a plurality of serial data drivers in the adapter and a plurality of serial data receivers in the switch, each serial data receiver in the switch corresponding to one of the plurality of serial data drivers in the adapter;

a first plurality of unidirectional pairs, each pair carrying serial data from one of the plurality of serial data drivers in the adapter to the corresponding serial data receiver in the switch;

a plurality of serial data drivers in the switch and a plurality of serial data receivers in the adapter, each serial data receiver in the adapter corresponding to one of the plurality of serial data drivers in the switch; and a second plurality of unidirectional pairs, each pair carrying serial data from one of the serial data drivers in the switch to the corresponding serial data receiver in the adapter.

8. The system for busing data in a DASD controller as in claim 3 wherein each direction of each bidirectional multichannel serial link comprises:

a plurality of serial data drivers;

a serial data receiver corresponding to each of the plurality of serial data drivers, the serial data receiver in communication with the corresponding serial data driver;

a serial clock driver; and a serial clock receiver in communication with the serial clock driver.

9. The system for busing data in a DASD controller as in claim 8 wherein at least one serial data driver comprises a flat panel display driver.

10. The system for busing data in a DASD controller as in claim 8 wherein at least one serial data receiver comprises a flat panel display receiver.

11. The system for busing data in a DASD controller as in claim 8 wherein the serial clock driver comprises a flat panel display driver.

12. The system for busing data in a DASD controller as in claim 8 wherein the serial clock receiver comprises a flat panel display receiver.

13. The system for busing data in a DASD controller as in claim 8 wherein each direction of each bidirectional multichannel serial link further comprises a group serial transmitter, the group serial transmitter operative to (a) input a parallel data value at a slow clock rate;

(b) convert the parallel data value into a plurality of serial sequences;

(c) generate a fast clock rate from the slow clock rate;

(d) transmit each serial sequence using one of the plurality of serial data drivers at a rate determined by the fast clock rate; and (e) transmit a signal corresponding to the fast clock rate using the serial clock driver.

14. The system for busing data in a DASD controller as in claim 13 wherein each direction of each bidirectional multichannel serial link further comprises a group serial receiver, the group serial receiver operative to:

(a) accept the signal corresponding to the fast clock rate from the serial clock driver;

(b) accept the plurality of serial sequences from the plurality of serial data drivers;

(c) generate a slow clock rate from the fast clock rate;

(d) convert the plurality of serial sequences to a parallel representation of the data value;

(e) output the parallel representation of the data value at the slow clock rate; and (f) output a signal corresponding to the slow clock rate.

* * * * *